US010967700B2

(12) United States Patent
Sturza et al.

(10) Patent No.: US 10,967,700 B2
(45) Date of Patent: Apr. 6, 2021

(54) VEHICLE HVAC SYSTEM

(71) Applicants: Brian P Sturza, Washington, MI (US);
Kenneth M Speck, Clarkston, MI (US)

(72) Inventors: Brian P Sturza, Washington, MI (US);
Kenneth M Speck, Clarkston, MI (US)

(73) Assignee: FCA US LLC, Auburn Hills, MI (US)

(*) Notice: Subject to any disclaimer, the term of this patent is extended or adjusted under 35 U.S.C. 154(b) by 302 days.

(21) Appl. No.: 15/969,205

(22) Filed: May 2, 2018

(65) Prior Publication Data
US 2019/0337352 A1 Nov. 7, 2019

(51) Int. Cl.
B60H 1/24 (2006.01)
B60H 1/00 (2006.01)
F16H 59/02 (2006.01)

(52) U.S. Cl.
CPC ......... B60H 1/00028 (2013.01); B60H 1/246 (2013.01); B60H 2001/002 (2013.01); F16H 59/02 (2013.01); F16H 2059/026 (2013.01)

(58) Field of Classification Search
CPC .......... B60H 2001/00185; B60H 2001/00242; B60H 1/00564; B60H 1/244; B60H 1/00028; B60H 1/00021; B60H 1/246; B60H 2001/002; B60H 2001/00221
USPC .......................................... 454/69, 141–144
See application file for complete search history.

(56) References Cited

U.S. PATENT DOCUMENTS

| 6,000,296 A * | 12/1999 | Sundquist | B60K 20/04 180/233 |
| 6,622,583 B2 | 9/2003 | Wag | |
| 9,738,155 B2 | 8/2017 | Chen et al. | |
| 2013/0149951 A1 * | 6/2013 | Park | B60H 1/00028 454/145 |
| 2013/0324029 A1 * | 12/2013 | Sandman | F16L 23/16 454/333 |
| 2017/0080871 A1 * | 3/2017 | Mizobata | B60R 11/00 |

FOREIGN PATENT DOCUMENTS

JP 2017043141 A * 3/2017

* cited by examiner

Primary Examiner — Vivek K Shirsat
Assistant Examiner — Ko-Wei Lin
(74) Attorney, Agent, or Firm — Ralph E. Smith

(57) ABSTRACT

A vehicle HVAC system delivers airflow to a vehicle occupant cabin having a front row and a rear row. The vehicle HVAC system includes a casing, a front duct, a shifter base assembly and a distribution duct. The front duct defines an airflow passageway that is fluidly coupled to the casing. The shifter base assembly is disposed in the vehicle occupant cabin and includes a base housing defining an airflow passageway that is fluidly coupled to the front duct. The distribution duct defines an airflow passageway that is fluidly coupled to the shifter base assembly and the rear row of the vehicle occupant cabin. The airflow passageways of the casing, the front duct, the base housing and the distribution duct form a continuous passageway through which air flows into the rear row of the vehicle occupant cabin.

15 Claims, 11 Drawing Sheets

VEHICLE HVAC SYSTEM

CROSS-REFERENCE TO RELATED APPLICATIONS

This application claims the benefit of U.S. Provisional Application No. 62/590,025, filed on Nov. 22, 2017. The entire disclosure of the above application is incorporated herein by reference.

FIELD

The present disclosure relates to a vehicle HVAC system.

BACKGROUND

This section provides background information relates to the present disclosure and is not necessarily prior art.

Some vehicles include an HVAC (heating, ventilation, and air conditioning) system that provides airflow to a front row and a rear row (e.g., second row and/or third row) of a vehicle occupant cabin to heat and cool vehicle occupants therein. The HVAC system of these vehicles includes a large number of parts (e.g., duct lines) to provide the airflow to the front row and rear row of the vehicle cabin. Furthermore, such vehicles require ample packaging space to allow the HVAC system to be installed therein. The HVAC system of the present disclosure provides airflow to the front row and rear row(s) of the vehicle while reducing the number of parts and allows the HVAC system to be installed in a smaller packaging space.

SUMMARY

This section provides a general summary of the disclosure, and is not a comprehensive disclosure of its full scope or all its features.

In one form, the present disclosure provides a vehicle HVAC system for delivering airflow to a vehicle occupant cabin having a front row and a rear row. The vehicle HVAC system includes a casing, a front duct, a shifter base assembly and a distribution duct. The front duct defines an airflow passageway that is fluidly coupled to the casing. The shifter base assembly is disposed in the vehicle occupant cabin and includes a base housing defining an airflow passageway that is fluidly coupled to the front duct. The distribution duct defines an airflow passageway that is fluidly coupled to the shifter base assembly and the rear row of the vehicle occupant cabin. The airflow passageways through the casing, the front duct, the base housing and the distribution duct form a continuous passageway through which air flows into the rear row of the vehicle occupant cabin.

In some configurations, the vehicle HVAC system includes a plurality of conduits, each conduit defining an airflow passageway that is coupled to the airflow passageway of the distribution duct and fluidly coupled to the rear row of the vehicle occupant cabin.

In some configurations, the distribution duct extends from the front row of the vehicle occupant cabin toward the rear row of the vehicle occupant cabin.

In some configurations, the shifter base assembly includes a shifter lever unit having a lever base and a shifter lever, and wherein the lever base is attached to a mounting portion formed on the base housing and the shifter lever is pivotally attached to the lever base.

In some configurations, the shifter base assembly includes a transfer shifter apparatus having a transfer housing and a transfer shifter device, and wherein the transfer housing is attached to another mounting portion and a support portion extending from the base housing, and the transfer shifter apparatus is pivotally attached to the transfer housing.

In some configurations, the airflow passageway of the base housing extends along a longitudinal direction of the base housing.

In some configurations, the vehicle HVAC system includes a blower unit that is fluidly coupled to the casing.

In some configurations, the blower unit is configured to blow air through the airflow passageways of the casing, the front duct, the base housing, the distribution duct, and a corresponding conduit and out into the rear row of the vehicle occupant cabin.

In some configurations, the shifter base assembly includes a mounting portion and a support portion, and wherein the mounting portion is formed on the base housing and the support portion is supported by the basing housing and the mounting portion such that a top surface thereof is positioned above the base housing and the mounting portion.

In some configurations, the shifter base assembly further includes a shifter lever unit having a shifter rod and a shifter handle, and wherein the shifter rod is pivotally coupled to the support portion and the shifter handle is disposed over the shifter rod.

In some configurations, the airflow passageway of the distribution duct is fluidly coupled to the airflow passageway of the base housing via an adaptor member.

Further areas of applicability of the teachings of the present disclosure will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not of all possible implementations, and are not intended to limit the scope of the present disclosure.

DETAILED DESCRIPTION

Example embodiments will now be described more fully with reference to the accompanying drawings.

Figure 1:
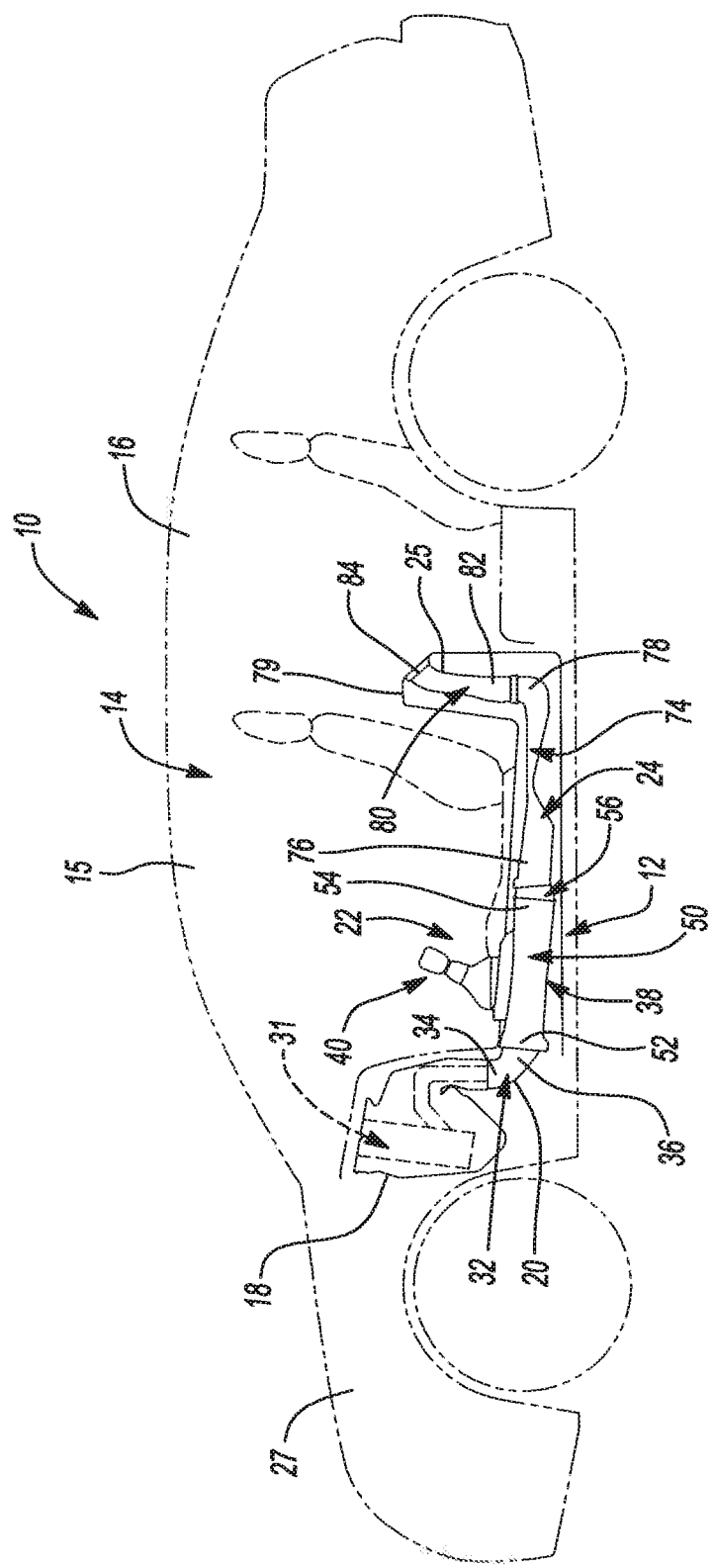
FIG. 1 is a vehicle including a heating, ventilation, and air conditioning (HVAC) system in accordance with the present teachings.
Figure 2:
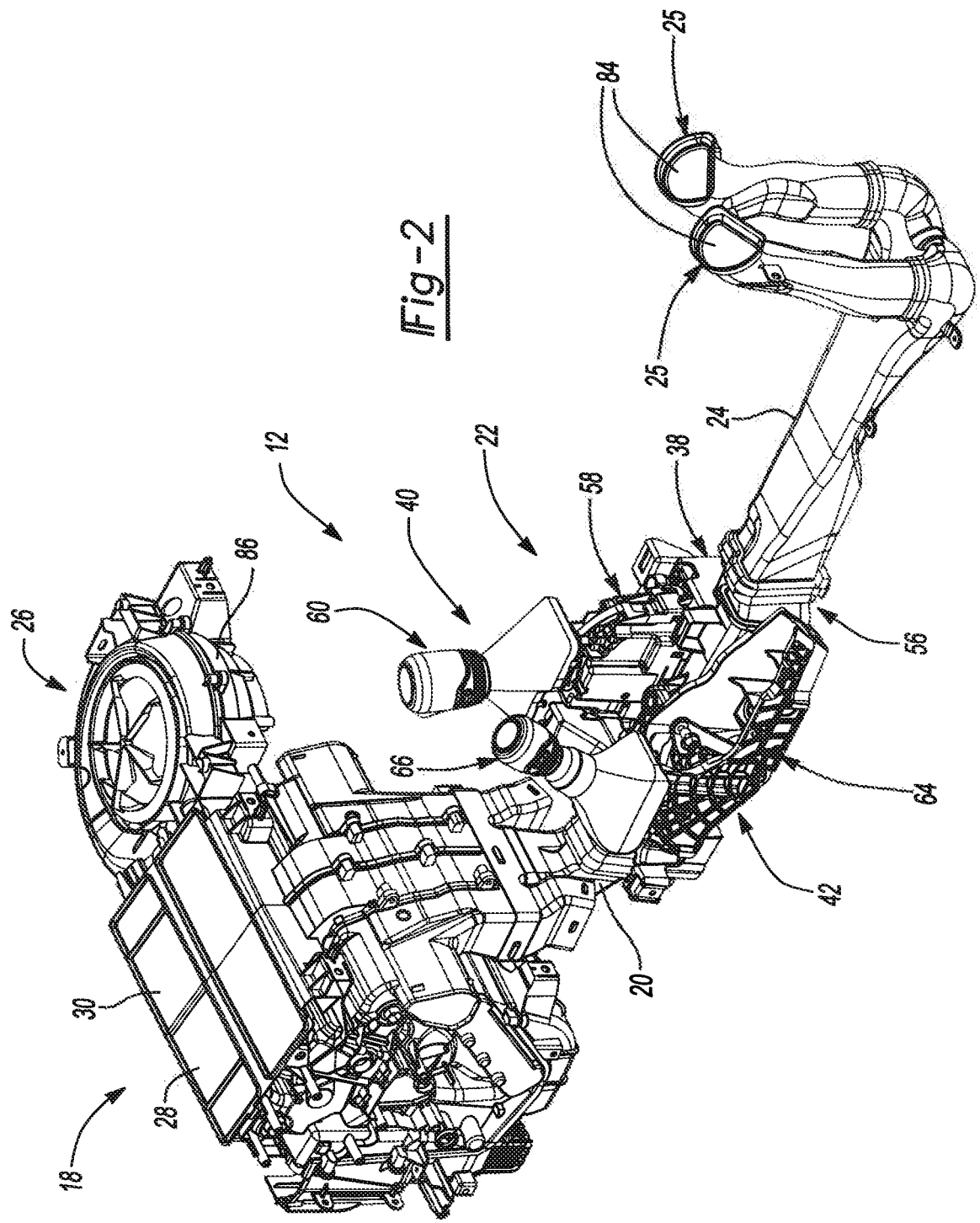
FIG. 2 is a perspective view of the HVAC system of FIG. 1.
Figure 3:
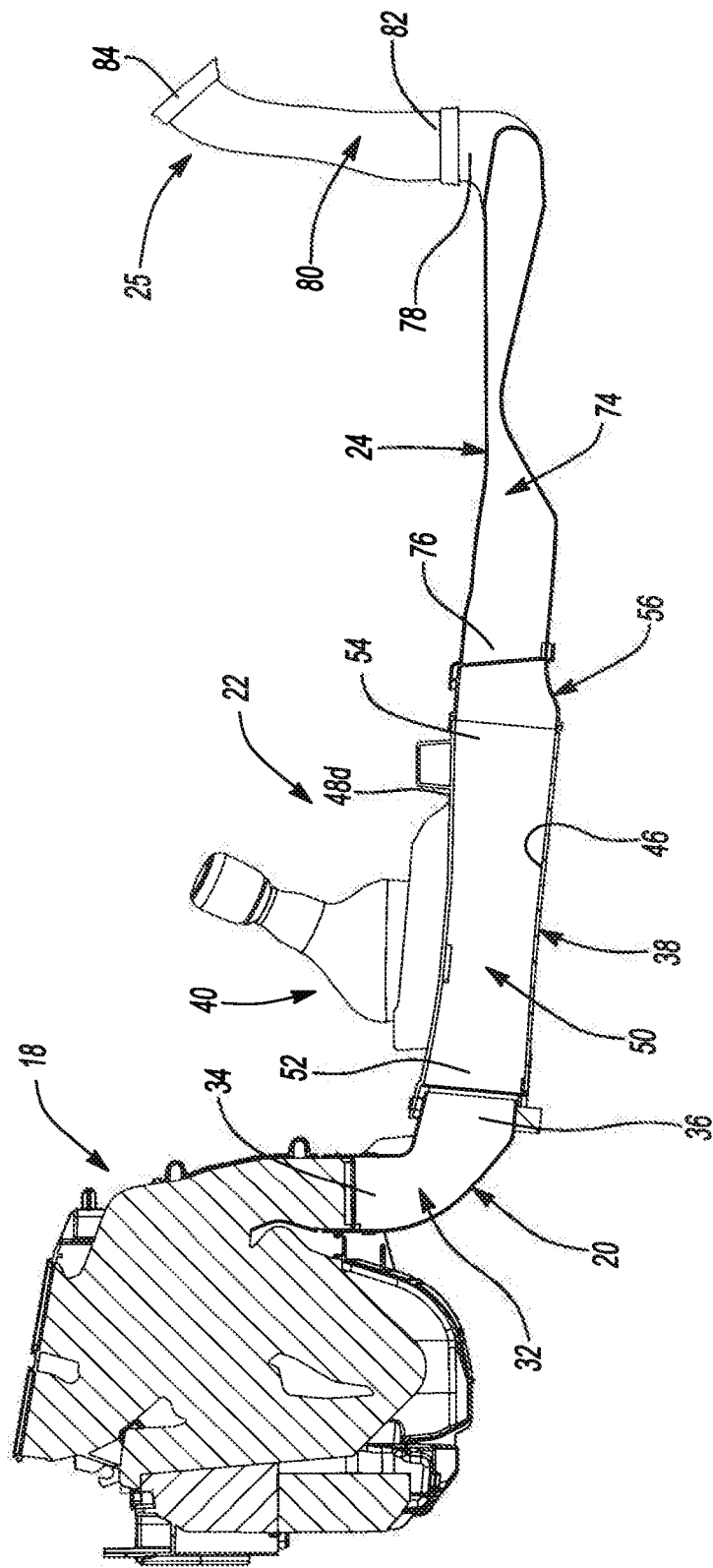
FIG. 3 is a cross-sectional view of the HVAC system of FIG. 2.

With reference to FIGS. 1-3, a vehicle 10 (FIG. 1) having a heating, ventilation, and air conditioning (HVAC) system 12 for delivering a flow of heated or cooled air to a vehicle occupant cabin 14 having a front row 15 and one or more rear rows 16 (e.g., second row and/or third row) is provided. The HVAC system 12 includes a casing 18, a front duct 20, a shifter base assembly 22, a rear or distribution duct 24, a plurality of conduits 25 and a blower unit 26 (FIG. 2). The casing 18 is disposed in a front portion 27 of the vehicle 10 and includes a first shell 28 and a second shell 30 (FIG. 2) that are attached to each other to define an airflow passageway 31. The airflow passageway 31 of the casing 18 is fluidly coupled to the front duct 20 so as to provide airflow flowing therethrough to the front duct 20.

As shown in FIGS. 1-3, the front duct 20 is attached to the casing 18 at one side and attached to the shifter base assembly 22 at another side. The front duct 20 also defines an airflow passageway 32 (FIGS. 1 and 3) that has an inlet 34 and an outlet 36. The inlet 34 is fluidly coupled to the airflow passageway 31 of the casing 18 and the outlet 36 is fluidly coupled to the shifter base assembly 22.

Figure 4:
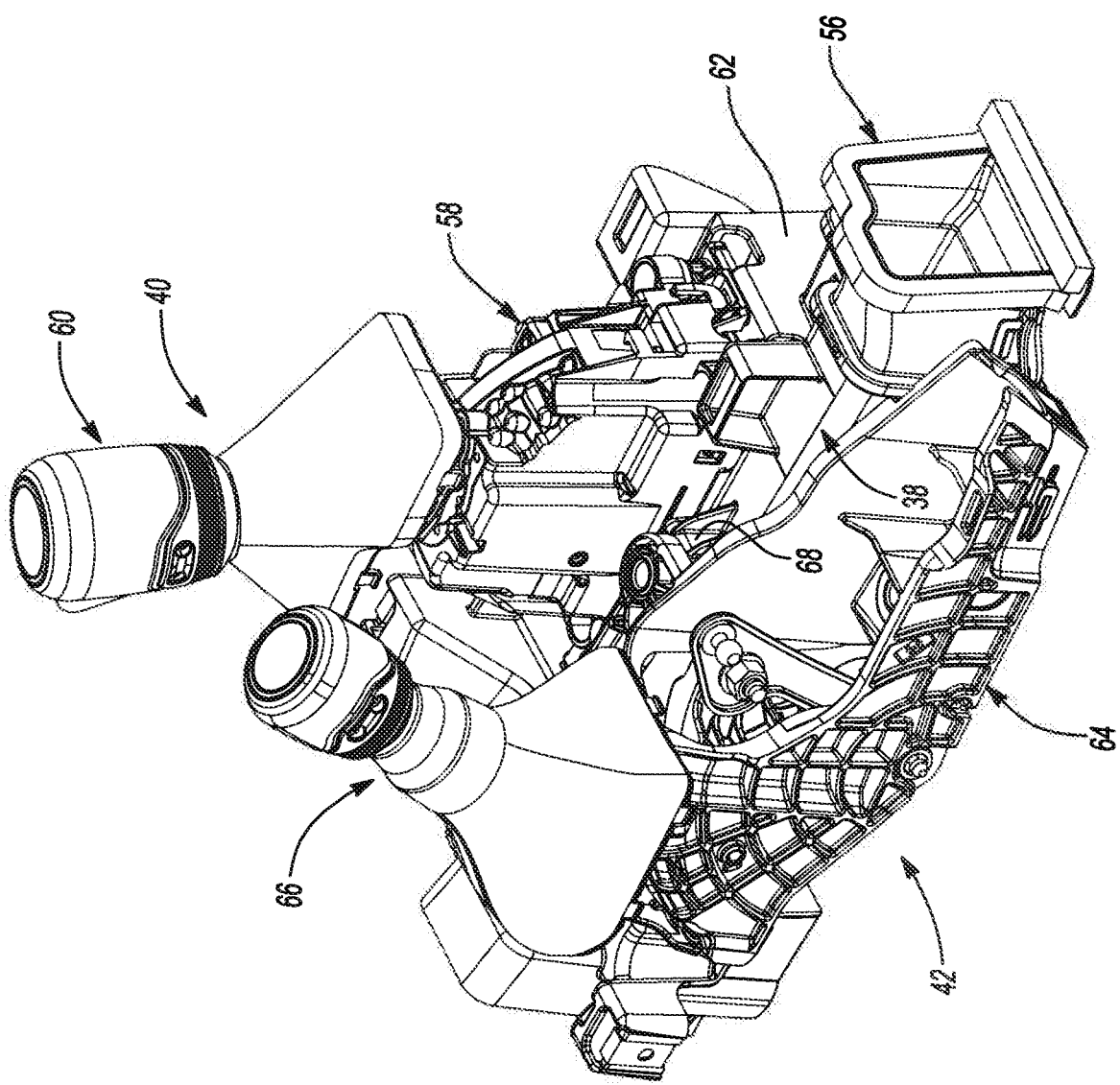
FIG. 4 is a perspective view of a shifter base assembly of the HVAC system.
Figure 5:
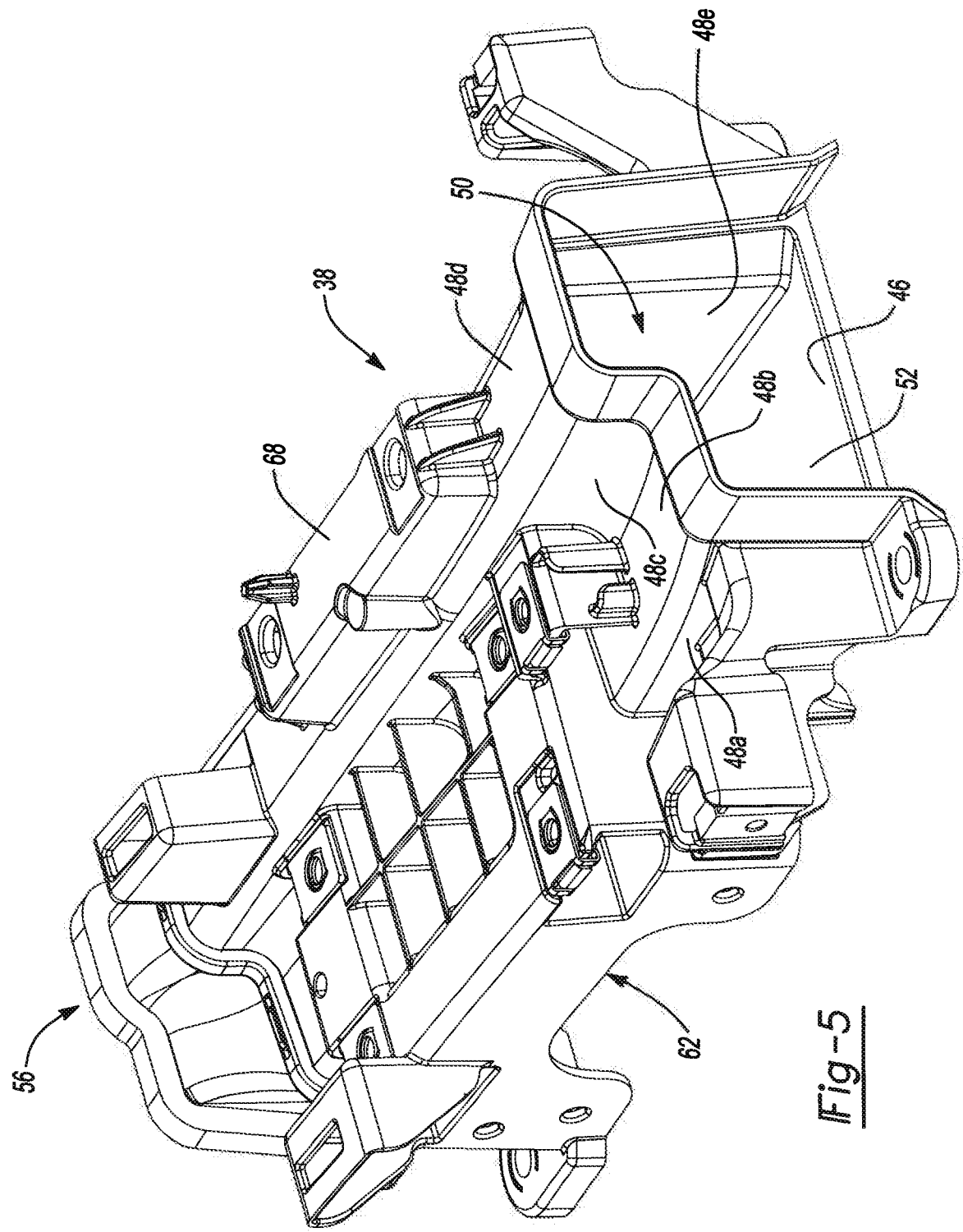
FIG. 5 is a perspective view of a base housing of the shifter base assembly.
Figure 6:
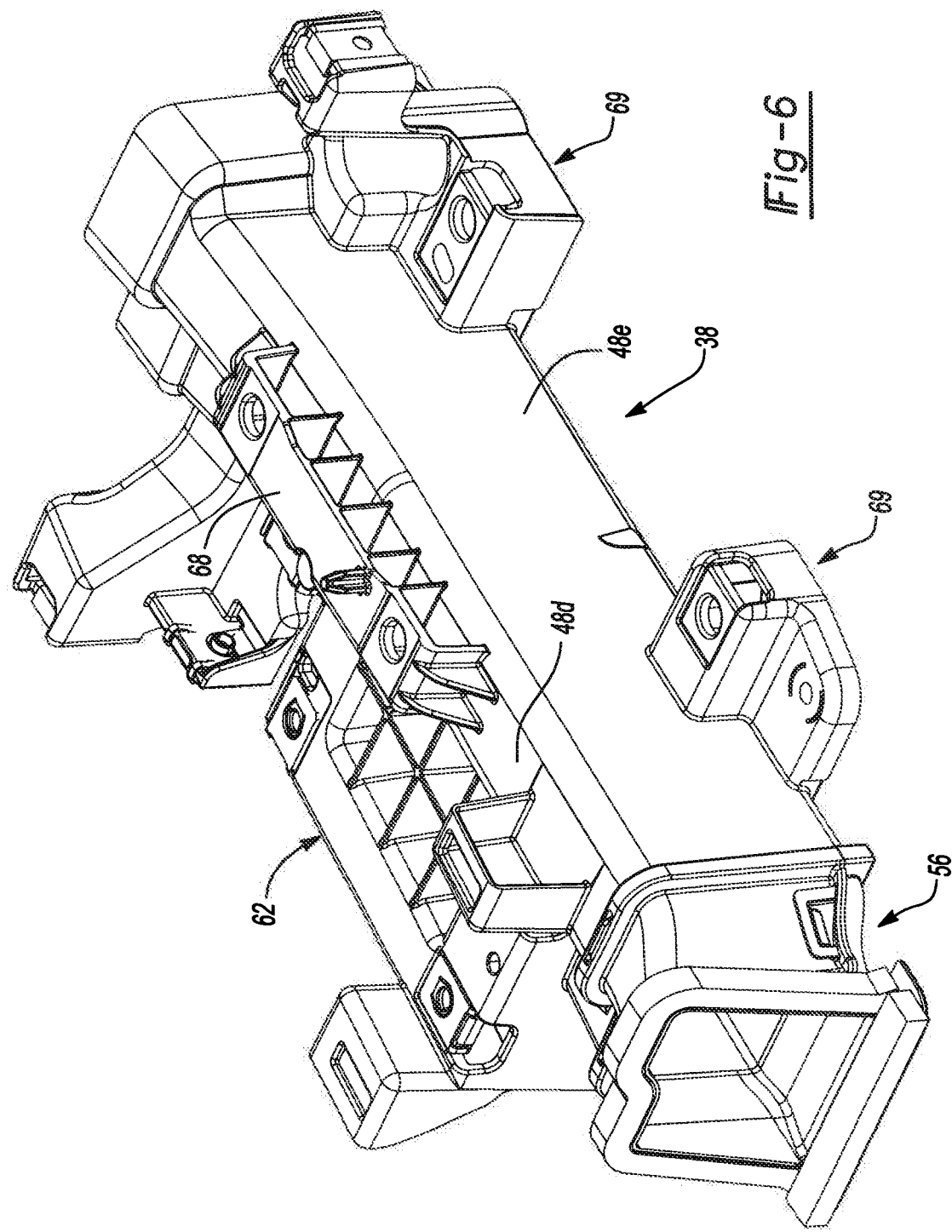
FIG. 6 is another perspective view of the base housing of the shifter base assembly.
Figure 7:
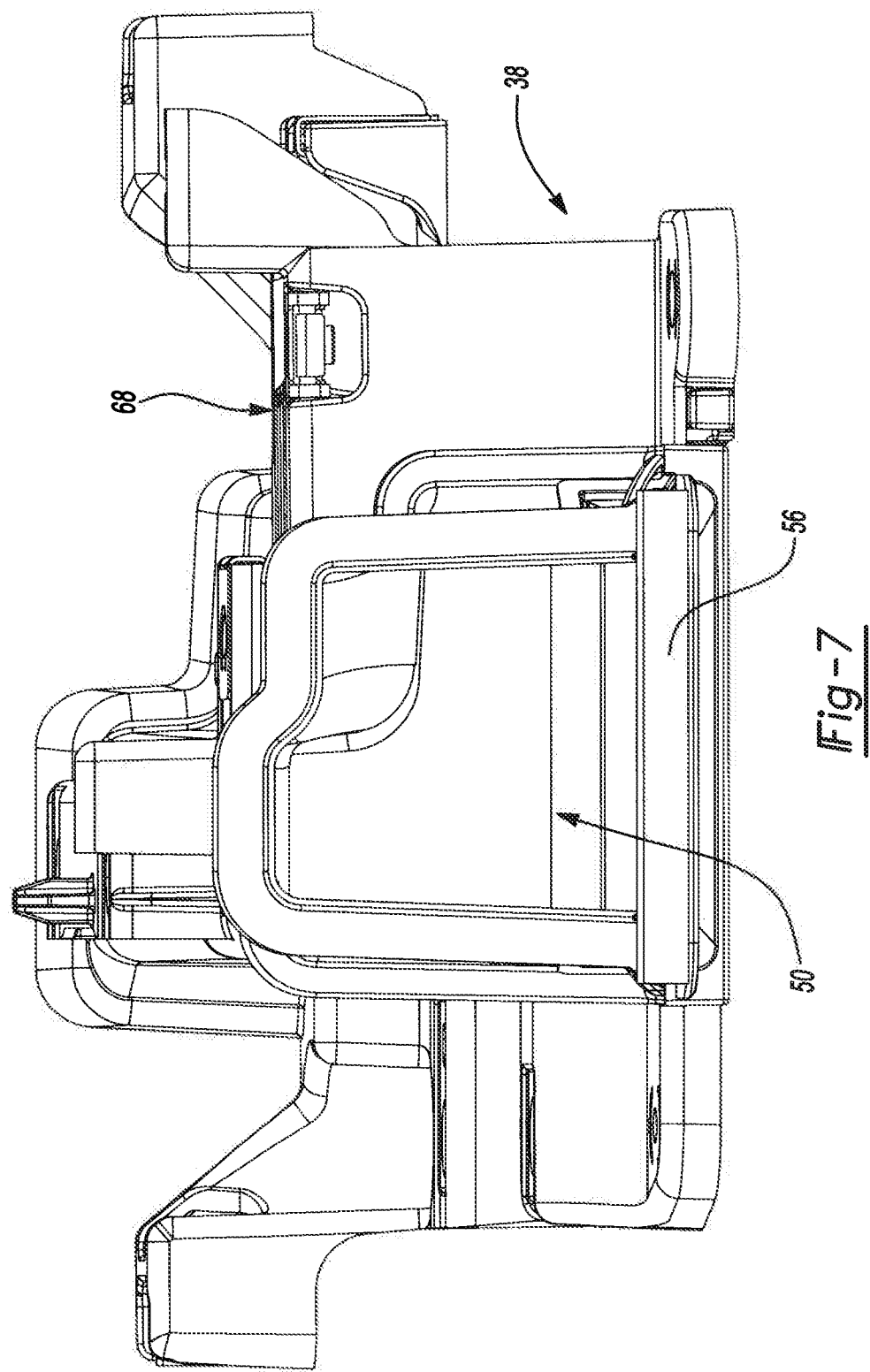
FIG. 7 is a front view of the base housing of the shifter base assembly.

With reference to FIGS. 1-7, the shifter base assembly 22 is disposed in the front row 15 of the vehicle 10 (FIG. 1) and includes a base housing 38, a shifter lever unit 40 (FIGS. 1-4) and a transfer shifter apparatus 42 (FIGS. 2 and 4). The base housing 38 includes a base 46 and a plurality of walls 48a, 48b, 48c, 48d, 48e that cooperate to define an airflow passageway 50 (FIGS. 1, 3 and 7) that extends through the base housing 38 along a longitudinal direction (i.e., a fore-aft direction) of the base housing 38. The airflow passageway 50 of the base housing 38 includes an inlet 52 (FIGS. 1 and 3) and an outlet 54 (FIGS. 1 and 3). The inlet 52 is fluidly coupled to the airflow passageway 32 of the front duct 20, and the outlet 54 is fluidly coupled to the distribution duct 24 via an adaptor member 56.

The shifter lever unit 40 includes a lever base 58 and a shifter lever 60. The lever base 58 is attached to a first mounting portion 62 (FIGS. 4-6) that is formed on the walls 48a, 48b, 48c of the base housing 38. The shifter lever 60 is pivotally attached to the lever base 58 and is operatively connected to a vehicle transmission (not shown) via cables, wires, and/or other actuation devices, for example, to shift the vehicle 10 between a plurality of operating modes (e.g., Park, Reverse, Drive, Neutral).

The transfer shifter apparatus 42 includes a transfer housing 64 and a transfer shifter device 66. The transfer housing 64 is mounted to a second mounting portion 68 (FIGS. 4-6) that extends upwardly from the wall 48d of the base housing 38 and a support portion 69 (FIG. 6) that extends outwardly from the wall 48e of the base housing 38. In some configurations, the transfer housing 64 can be integrally attached to the base housing 38 instead of mounted thereto. The transfer shifter device 66 is pivotally attached to the transfer housing 64 and operatively connected to a transfer case (not shown) via cables, wires, and/or other actuation devices, for example, to shift the vehicle 10 between a plurality of drive states (a four-wheel-drive state and a two-wheel-drive state, for example).

The distribution duct 24 (FIGS. 1-3) is attached to the base housing 38 (via the adaptor member 56) at one side and extends toward the rear row 16 of the vehicle 10 (FIG. 1) at another side. The distribution duct 24 also defines an airflow passageway 74 (FIGS. 1 and 3) that has an inlet 76 and a plurality of outlets 78 (only one shown in FIGS. 1 and 3). The inlet 76 is fluidly coupled to the outlet 54 of the airflow passageway 50 of the base housing 38 (via the adaptor member 56) and each outlet 78 is fluidly coupled to a corresponding conduit 25.

Each conduit 25 extends perpendicularly from the distribution duct 24 within a console 79 of the vehicle 10 (only one conduit 25 is shown within the console 79 in FIG. 1). Each conduit 25 also defines an airflow passageway 80 (only one airflow passageway 80 is shown in FIGS. 1 and 3) that has an inlet 82 and an outlet 84. The inlet 82 is fluidly coupled to a corresponding outlet 78 of the airflow passageway 74 of the distribution duct 24 and the outlet 84 is fluidly coupled to the rear row 16 of the vehicle occupant cabin 14. Airflow flowing through the casing 18 and the airflow passageways 32, 50, 74 80 of the front duct 20, the base housing 38, the distribution duct 24, and a corresponding conduit 25, respectively, exits through a corresponding vent (not shown) of the console 79 and into the rear row 16 of the vehicle occupant cabin 14.

The blower unit 26 is attached to the casing 18 (FIG. 2) of the HVAC system 12 and includes a housing 86 and a blower fan (not shown) disposed within the housing 86. When the blower unit 26 is in operation (i.e., in the ON mode), the blower fan rotates to draw in air through an inlet (not shown) and blows air through the airflow passageways 31, 32, 50, 74 80 of the casing 18, the front duct 20, the base housing 38, the distribution duct 24, and the corresponding conduit 25, respectively, and exits through the corresponding vent (not shown) of the console 79 and into the rear row 16 of the vehicle occupant cabin 14.

One of the benefits of the HVAC system 12 of the present disclosure is that the airflow passageways 31, 32, 50, 74, 80 of the casing 18, the front duct 20, the base housing 38, the distribution duct 24 and the corresponding conduit 25, respectively, form a continuous airflow passageway for airflow to flow therethrough without the need to route air ducts around the shifter base assembly 22 and/or around other vehicle components. In this way, the HVAC system 12 of the present disclosure can be installed in vehicles having small packaging spaces, for example.

It should be understood that although the shifter bracket assembly 22 is described in this configuration with regards to a vehicle having an automatic transmission, the shifter bracket assembly 22 in other configurations can operate in a similar or the same manner in a vehicle having a manual transmission.

Figure 8:
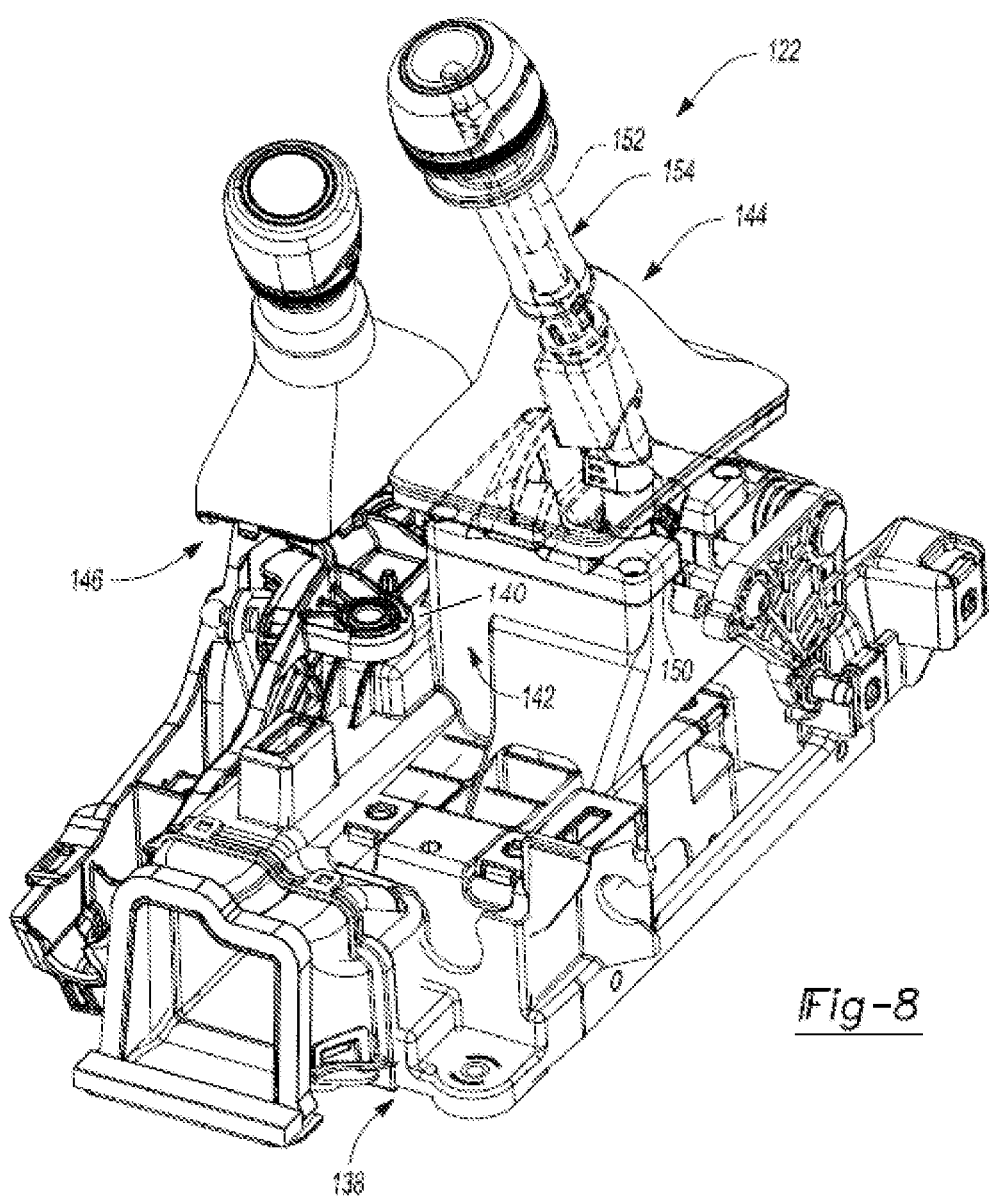
FIG. 8 is perspective view of another shifter base assembly.
Figure 9:
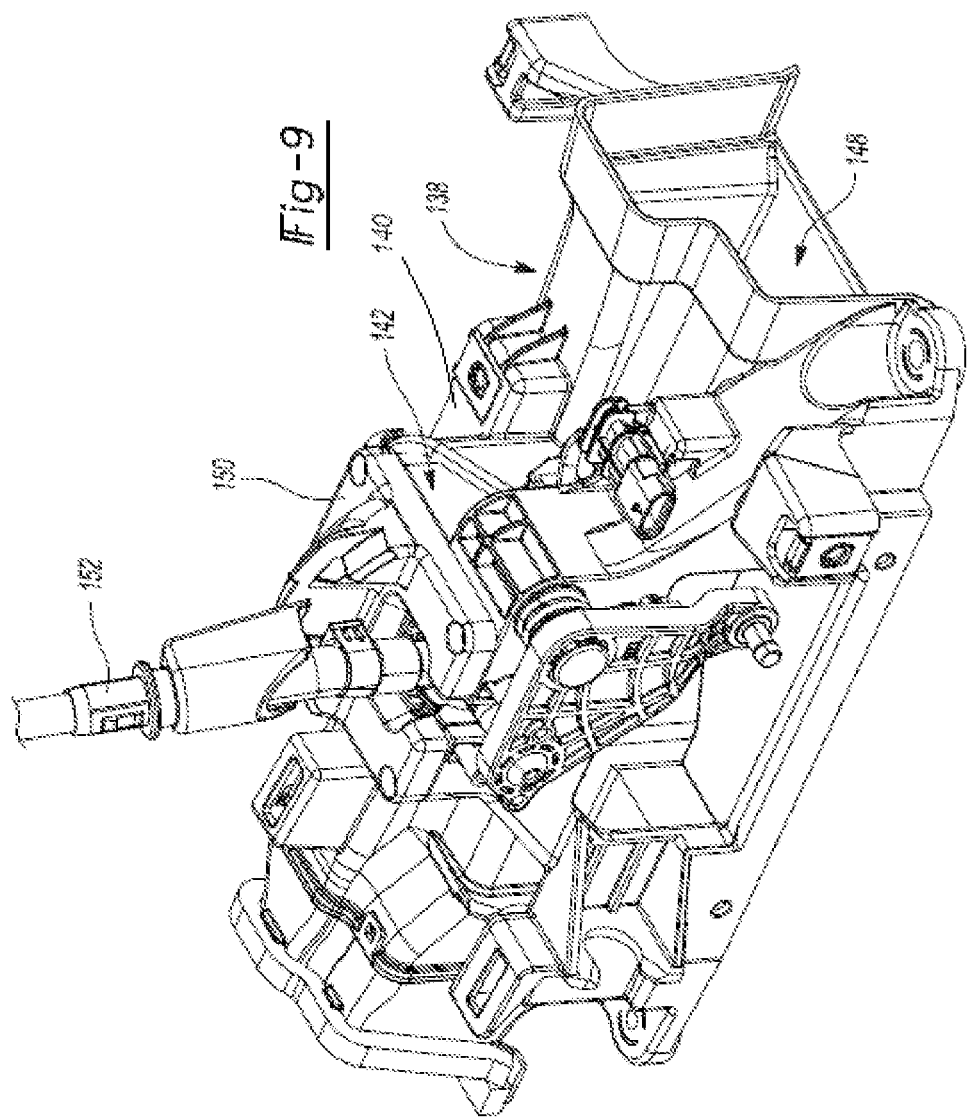
FIG. 9 is a perspective view of a base housing of the shifter base assembly shown in FIG. 8.
Figure 10:
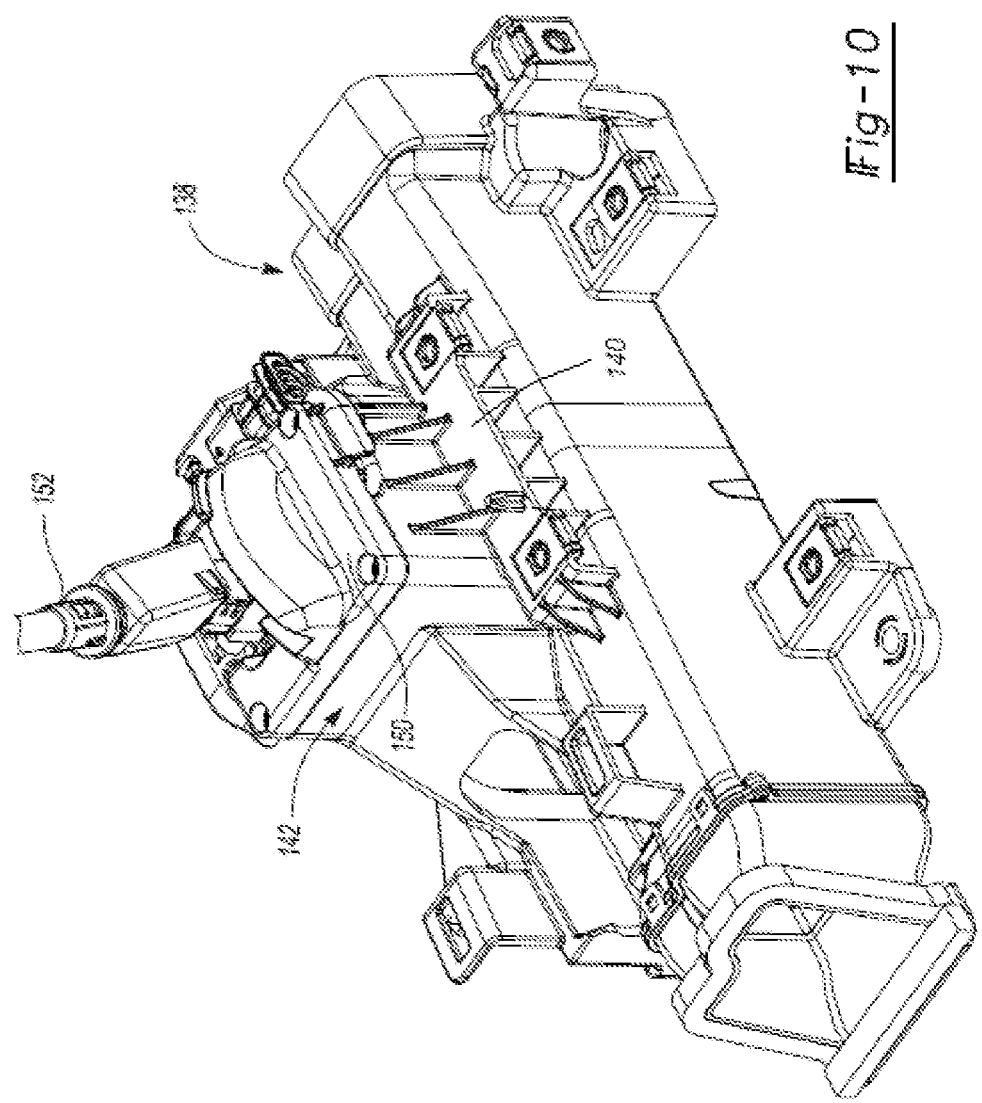
FIG. 10 is another perspective view of the base housing of the shifter base assembly shown in FIG. 8.
Figure 11:
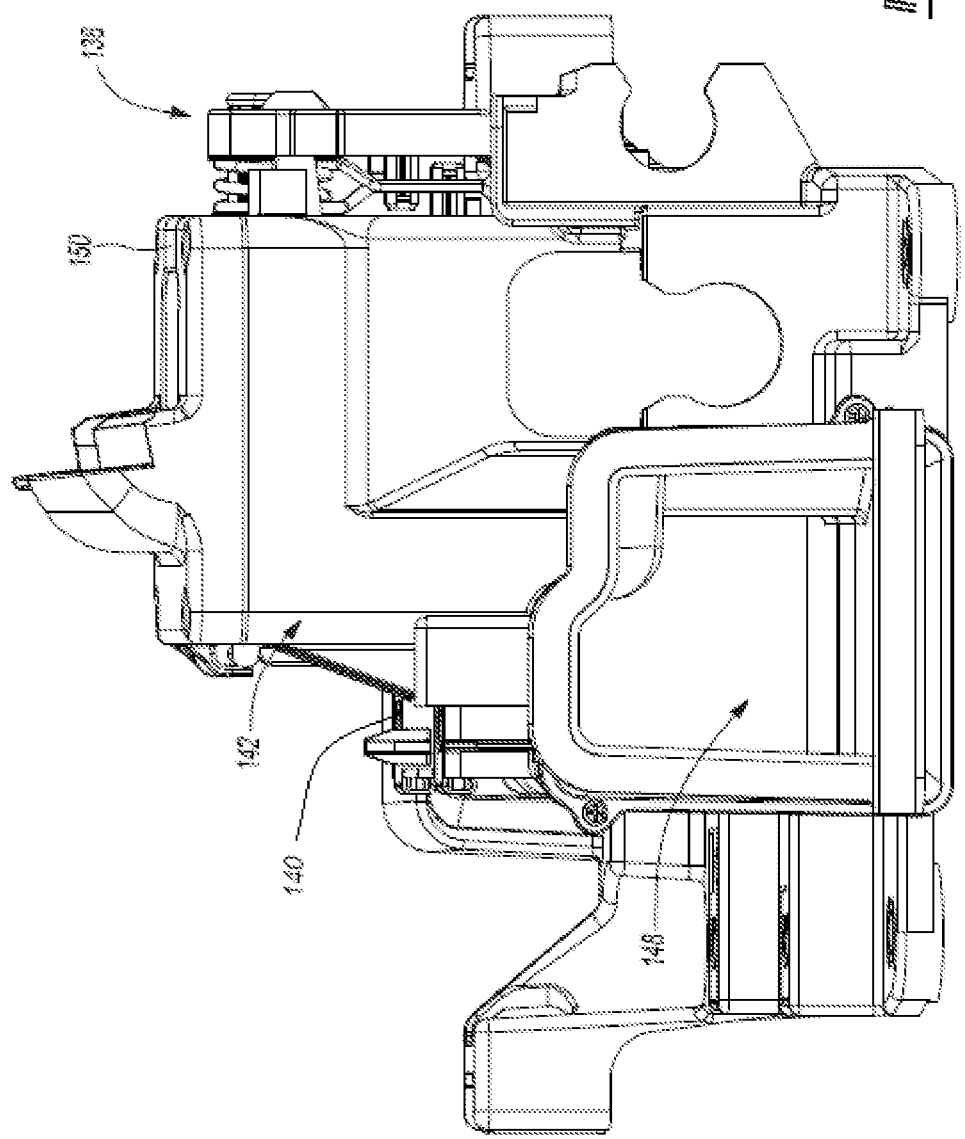
FIG. 11 is a front view of the base housing of the shifter base assembly shown in FIG. 8.

With reference to FIGS. 8-11, another shifter base assembly 122 is provided. The shifter base assembly 122 may be incorporated into the HVAC system 12 instead of the shifter base assembly 22. The shifter base assembly 122 may be similar or identical to the shifter base assembly 22 described above, apart from any differences described below. The shifter base assembly 122 includes a base housing 138, a mounting portion 140 (FIG. 8), a support portion 142, a shifter lever unit 144 and a transfer shifter apparatus 146 (FIG. 8). The base housing 138 defines an airflow passageway 148 (FIG. 11) that extends in a longitudinal direction of the base housing 138.

The mounting portion 140 is formed on the base housing 138. The support portion 142 is supported by the base housing 138 and the mounting portion 140 and extends upwardly from the base housing 138 and the mounting portion 140 such that a top surface 150 of the support portion 142 is positioned above the base housing 138 and the mounting portion 140.

The shifter lever unit 144 includes a shifter rod 152 and a shifter handle 154. The shifter rod 152 is pivotally coupled to the support portion 142 and operatively connected to a vehicle transmission (not shown) via cables, wires, and/or other actuation devices, for example, to shift the vehicle between a plurality of operation modes (e.g., a plurality of gears and Neutral). The shifter handle 154 is disposed over the shifter rod 152 so that a user can conveniently shift the vehicle between the plurality of operation modes.

The structure and function of the transfer shifter apparatus 146 is similar or identical to that of the transfer shifter apparatus 42 described above, and therefore, will not be described again.

It should be understood that although the shifter bracket assembly 122 is described in this configuration with regards to a vehicle having a manual transmission, the shifter bracket assembly 122 in other configurations can operate in a similar or the same manner in a vehicle having an automatic transmission.

What is claimed is:

1. A vehicle HVAC system for delivering airflow to a vehicle occupant cabin having a front row and a rear row, the vehicle HVAC system comprising:
    a casing defining an airflow passageway;
    a front duct defining an airflow passageway that is fluidly coupled to the airflow passageway of the casing;
    a shifter base assembly disposed in the vehicle occupant cabin and including a base housing defining an airflow passageway that is fluidly coupled to the airflow passageway of the front duct; and
    a distribution duct defining an airflow passageway that is fluidly coupled to the airflow passageway of the base housing of the shifter base assembly and the rear row of the vehicle occupant cabin,
    wherein the airflow passageways through the casing, the front duct, the base housing and the distribution duct form a continuous passageway through which air flows into the rear row of the vehicle occupant cabin,
    wherein the shifter base assembly includes a shifter lever unit having a lever base and a shifter lever, and wherein the lever base is attached to a mounting portion formed on the base housing and the shifter lever is pivotally attached to the lever base; and
    wherein the shifter base assembly includes a transfer shifter apparatus having a transfer housing and a transfer shifter device, and wherein the transfer housing is attached to another mounting portion and a support portion extending from the base housing, and the transfer shifter device is pivotally attached to the transfer housing.

2. The vehicle HVAC system of claim 1, further comprising a plurality of conduits, each conduit defining an airflow passageway that is coupled to the airflow passageway of the distribution duct and fluidly coupled to the rear row of the vehicle occupant cabin.

3. The vehicle HVAC system of claim 2, wherein the distribution duct extends from the front row of the vehicle occupant cabin toward the rear row of the vehicle occupant cabin.

4. The vehicle HVAC system of claim 1, wherein the airflow passageway of the base housing extends along a longitudinal direction of the base housing.

5. The vehicle HVAC system of claim 4, further comprising a blower unit that is fluidly coupled to the casing.

6. The vehicle HVAC system of claim 5, wherein the blower unit is configured to blow air through the airflow passageways of the casing, the front duct, the base housing, the distribution duct, and a corresponding conduit and out into the rear row of the vehicle occupant cabin.

7. The vehicle HVAC system of claim 1, wherein the airflow passageway of the distribution duct is fluidly coupled to the airflow passageway of the base housing via an adaptor member.

8. A vehicle HVAC system for delivering airflow to a vehicle occupant cabin having a front row and a rear row, the vehicle HVAC system comprising:
    a casing defining an airflow passageway;
    a front duct defining an airflow passageway that is fluidly coupled to the airflow passageway of the casing;
    a shifter base assembly disposed in the vehicle occupant cabin and including a base housing defining an airflow passageway that is fluidly coupled to the airflow passageway of the front duct; and
    a distribution duct defining an airflow passageway that is fluidly coupled to the airflow passageway of the base housing of the shifter base assembly and the rear row of the vehicle occupant cabin,
    wherein the airflow passageways through the casing, the front duct, the base housing and the distribution duct form a continuous passageway through which air flows into the rear row of the vehicle occupant cabin; and
    wherein the shifter base assembly includes a mounting portion and a support portion, and wherein the mounting portion is formed on the base housing and the support portion is supported by the base housing and the mounting portion such that a top surface of the support portion is positioned above the base housing and the mounting portion.

9. The vehicle HVAC system of claim 8, wherein the shifter base assembly further includes a shifter lever unit having a shifter rod and a shifter handle, and wherein the shifter rod is pivotally coupled to the support portion and the shifter handle is disposed over the shifter rod.

10. The vehicle HVAC system of claim 8, further comprising a plurality of conduits, each conduit defining an airflow passageway that is coupled to the airflow passageway of the distribution duct and fluidly coupled to the rear row of the vehicle occupant cabin.

11. The vehicle HVAC system of claim 8, wherein the distribution duct extends from the front row of the vehicle occupant cabin toward the rear row of the vehicle occupant cabin.

12. The vehicle HVAC system of claim 8, wherein the airflow passageway of the base housing extends along a longitudinal direction of the base housing.

13. The vehicle HVAC system of claim 8, further comprising a blower unit that is fluidly coupled to the casing.

14. The vehicle HVAC system of claim 13, wherein the blower unit is configured to blow air through the airflow passageways of the casing, the front duct, the base housing, the distribution duct, and a corresponding conduit and out into the rear row of the vehicle occupant cabin.

15. The vehicle HVAC system of claim 8, wherein the airflow passageway of the distribution duct is fluidly coupled to the airflow passageway of the base housing via an adaptor member.

* * * * *